Patented Aug. 17, 1954

2,686,803

UNITED STATES PATENT OFFICE 2,686,803

SURFACE-ACTIVE ESTERS OF ALKENE PHOSPHONOUS ACIDS

Richard D. Stayner, Berkeley, Calif., assignor to California Research Corporation, San Francisco, Calif., a corporation of Delaware No Drawing. Original application December 30, 1950, Serial No. 203,787. Divided and this application March 6, 1952, Serial No. 275,217

2 Claims. (Cl. 260—461)

This invention relates to the preparation of organic phosphorus-bearing compounds, and more particularly to a new process for preparing alkene phosphonous acids.

This application is a division of my application Serial No. 203,787, filed December 30, 1950.

In the following description the term "alkene phosphonous acids" will refer to the structure:

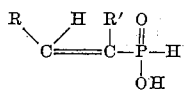

wherein R and R' may be a hydrogen or an alkyl group. This is thought to be the preferred representation of these acids, although a number of writers, e. g., Arbuzov, consider them to possess the keto-enolic structure (see Kosolapoff in "Organophosphorus Compounds," 1950, a book published by Wiley & Sons, page 144).

Owing to the presence of a hydrophobic alkenyl group and of a hydrophilic phosphonous acid radical, alkene phosphonous acids constitute desirable materials for the preparation of a large number of surface-active compounds suitable as ingredients for a great variety of useful compositions, e. g., detergents, wetting agents and foam agents.

It is a primary object of the present invention to provide a process for preparing alkene phosphonous acids by a heretofore unknown reaction of a olefin, phosphorus trichloride and acetic anhydride, resulting in the formation of an organic intermediate containing two phosphorus atoms, three oxygen atoms and a saturated hydrocarbon group, this intermediate upon hydrolysis and dehydration providing good yields of alkene phosphonous acid.

Another object of the present invention is to provide valuable surface-active derivatives of alkene phosphonous acids by reacting these acids with alkylene and polyalkylene glycols.

Still another object of the invention is to provide valuable partial esters derived from the intermediates produced by the aforementioned reaction of an olefin, phosphorus trichloride and acetic anhydride, said partial esters being secured by esterifying the intermediates with alcohols.

Other objects of this invention will appear from the description hereinafter.

In accordance with my present discovery, alkene phosphonous acids are obtained by reacting an olefin, phosphorus trichloride and acetic anhydride, and by subsequently hydrolyzing and dehydrating the resulting reaction product mixture.

While my invention is not to be restricted by theoretical considerations, the probable mechanism of the exothermic reaction between the olefins, phosphorus trichloride and acetic anhydride is the formation of organic phosphorus-bearing intermediates which contain two phosphorus atoms and three oxygen atoms and will be designated hereinafter under the name of alkane phosphorites. These intermediates, in which the hydrocarbon portion is saturated, are converted by hydrolysis and dehydration to alkene phosphonous acids.

The formation of intermediates can be represented by the equation:

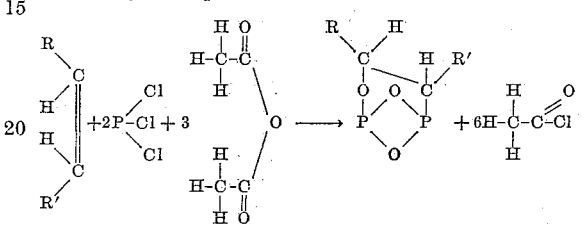

wherein R and R' may be hydrogen or alkyl radicals.

Hydrolysis and dehydration converts the alkane phosphorite intermediate to alkene phosphonous acid and phosphorous acid in accordance with the equation:

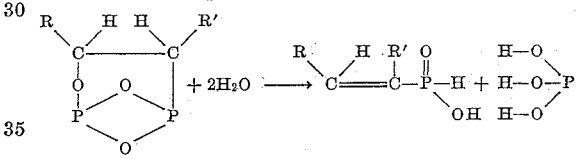

In carrying out the process of my invention the following general procedure will be employed. The olefin, acetic anhydride and phosphorus trichloride are introduced into a reaction flask to form a homogeneous liquid mixture which is stirred at a temperature ranging from about 0° to about 150° C., and preferably from about room temperature to about 80° C., for a period of time which may range from about 8 to about 12 hours. A crystalline precipitate of alkane phosphorite intermediate is formed, and the mixture is allowed to stand in order to complete the reaction, which may require as much as 70 hours, depending on the molar ratio of the initial reactants and the reaction temperature. Thereafter, the mixture containing the precipitate is treated with an excess of water at a temperature from about 50° to about 150° C., whereupon a vigorous reaction takes place. On extracting with ether and evaporating, alkene phosphonous acids formed by this hydrolyzing and dehydrating treatment are recovered in good yields of the order of 60 to 70% by weight based on the initial olefin. These acids are insoluble in water but dissolve in dilute caustic solutions. The acetyl chloride present in the mixture together with the intermediate is converted by hydrolysis to acetic acid, the presence of which, as well as that of the water-soluble phosphorous acid being formed, aid in catalyzing the hydrolysis of the intermediate to alkene phosphonous acids. The reactants for the aforedescribed formation of alkane phosphorite intermediates are employed in proportions ranging from about 1 to 3 mols of phosphorus trichloride and from about 1 to 4 mols of acetic anhydride to each mol of the olefin.

The time required for the formation of the desired alkane phosphorite is a function of temperature: the higher is the temperature the shorter is the time of reaction, and conversely.

The olefinic materials which may be employed for the production of alkene phosphonous acids by the process described hereinabove includes straight-chain olefins, iso-olefins, cyclo-olefins, polymerized olefins and arylated olefins, such as styrene. Olefins containing from 8 to 20 carbon atoms in the molecule are preferred, and, in particular, those derived by polymerizing propylene and containing from 9 to 18 carbon atoms.

While the relative proportions of the reactants for the production of alkane phosphorite intermediates may be varied within the limits hereinabove described, the best yields (of the order of 50 to 70% based on the weight of the initial olefin) of alkene phosphonous acids will be secured by employing a mixture of 1 mol of olefin to 2 mols of phosphorus trichloride and 3 mols of acetic anhydride. When acetic anhydride and phosphorus trichloride are employed in greater amounts, the yields do increase but the over-all cost of the process also increases.

While the invention in its broad aspect resides in reacting an olefin, phosphorus trichloride and acetic anhydride in order to form an alkane phosphorite intermediate convertible by hydrolysis and dehydration to alkene phosphonous acids, a preferred modification of my process contemplates reacting the above-named three reactants while simultaneously bubbling through their mixture a current of oxygen or air. This modified procedure permits of substantially reducing the time otherwise necessary for the formation of an intermediate convertible by hydrolysis and dehydration of alkene phosphonous acids. The intermediate produced in this case, however, is not an alkane phosphorite containing 3 oxygen atoms, but an alkane phosphorate containing four oxygen atoms, and the equation expressing its formation may be written as follows:

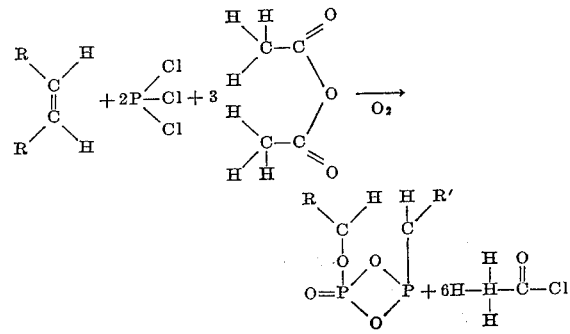

wherein R and R' are alkyl radicals.

Surprisingly enough, the subsequent hydrolysis and dehydration of the reaction product mixture containing the alkane phosphorate intermediate also produce good yields of alkene phosphonous acids in accordance with the following equation:

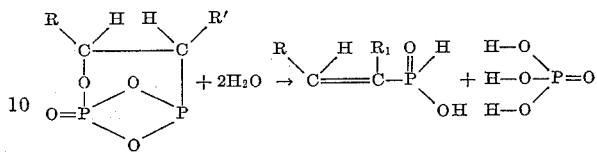

As can be seen from this equation, phosphoric acid is formed together with alkene phosphonous acid, but again the presence of phosphoric acid and of acetic acid resulting from the hydrolysis of acetyl chloride exercises a favorable catalytic effect on the reaction of formation of alkene phosphonous acids.

In this modification of the process of my invention a homogeneous liquid mixture of olefin, acetic anhydride and phosphorous trichloride is placed into a reaction flask and a current of pure oxygen or air is bubbled through at a temperature which may range from about 0° C. to about 150° C., but preferably from about room temperature to about 80° C. A colorless crystalline precipitate of alkane phosphorate is formed. However, on continuing to bubble the oxygen through the reaction mixture, this precipitate turns yellow in color and finally dissolves. When the reaction is completed, the alkane phosphorate intermediate can be reprecipitated with the aid of petroleum ether. Upon treating this phosphorate with water at a temperature ranging from 50 to 150° C., alkene phosphonous acids insoluble in water but dissolving in aqueous solutions of caustic are readily recovered by extracting with ether and evaporating. An excess of oxygen over the molar amount of olefin is employed in order to secure the yield of alkane phosphorate comparable to those of alkane phosphorite obtainable without the introduction of oxygen or air. In view of the strongly exothermic character of the reaction, the application of oxygen in my process requires more cooling.

I have carried out numerous tests to produce alkene phosphonous acids in accordance with the aforedescribed invention. The analyses of the alkane phosphonous acids and of the corresponding alkane phosphorites and phosphorates confirm the nature of the products defined in the equations. A number of representative test runs of preparing alkene phosphonous acids and their corresponding intermediates are given below in Examples 1, 2, 3, 4, 5 and 6.

The intermediate alkane phosphorates and phosphorites are highly hygroscopic solids, insoluble in petroleum ether and benzene. In all instances they display low bromine numbers of the order of 0.2, indicating a complete saturation of their hydrocarbon portion. The color of these intermediates ranges from colorless through orange to dark brown, depending on the particular olefin involved, the duration of the reaction and on whether or not oxygen has been employed. The analyses of these intermediates indicate an absence of peroxides. Chlorine is found to be present merely as an impurity of the order of 1 to 5% based on the weight of the solid intermediate. Elemental analyses invariably show the presence of two atoms of phosphorus per molecule of the intermediate. The oxygen content determined by subtraction shows the presence of three oxygen atoms in the case of alkane phosphorite and four oxygen atoms in the case of alkane phosphorate. Furthermore, elemental analyses of ester derivatives of alkane phosphorates and alkane phosphorites, obtained by esterifying these intermediates with aliphatic alcohols, such as ethyl or butyl alcohol, likewise establish the presence of two phosphorus atoms in each molecule of the ester derivative. Although the exact bonding of the alkoxy groups to the phosphorus atoms of these partial esters is not definitely established, i. e. whether one alkoxy group is attached to each phosphorus atom or two alkoxy groups are attached but to one phosphorus atom as in

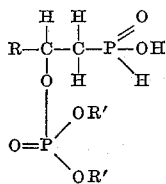

wherein R is an alkyl group and R' the hydrocarbon residue of the alcohol, they can be generally designated as dialkyl alkane phosphonite phosphates and dialkyl alkane phosphonite phosphites, depending on their being derived from alkane phosphorates or alkane phosphorites, respectively. The term "phosphonite" as employed herein refers to an ester of phosphonous acid.

On the other hand, the acid products obtained by hydrolysis and dehydration of the reaction product mixtures containing alkane phosphorites and alkane phosphorates, as the case may be, invariably display a high bromine number of the order of 50, characteristic of unsaturation. These acids are syrupy liquids stable to the action of water, which fact indicates the presence of a C-P and not C-O-P linkage. Repeated titrations of these acids indicated that they are monobasic. Additionally, in order to double-check the true nature of these alkene phosphonous acids, infrared spectral analysis tests were carried out, the results of which discount a possibility of the presence of alkene phosphonic rather than alkene phosphonous acids. A definite absorption peak is noted in the spectrograms at about 10.2 mu. This peak is a proof that an alkene structure, i. e., a carbon-to-carbon double bond, is present. The results of infrared spectral analysis agree with those of the elemental analysis and thus leave no doubt as to the nature of the alkene phosphonous acids obtained upon hydrolyzing and dehydrating alkane phosphorite and alkane phosphorate intermediates. The following specific examples are included to illustrate the operation of my invention in more detail.

*Example 1.—Preparation of n-decene phosphonous acid by way of alkane phosphorite (without introducing oxygen)*

A mixture of 274 g. (2 mols) of phosphorus trichloride, 306 g. (3 mols) of acetic anhydride and 140 g. (1 mol) of n-decene-1 is heated to 35° C. and stirred at that temperature for about 16 hours. Thereupon the reaction mixture is left to stand at room temperature for 72 hours. At the expiration of this period it is poured into 1 liter of cold water with continuous stirring and then heated on a steam plate for about one hour. On cooling the mixture, it is extracted with ethyl ether, and the ether extract is washed with dilute sodium hydroxide to remove the n-decene phosphonous acid as the sodium salt, the aqueous portion being thereafter extracted with ethyl ether to remove unreacted n-decene-1. The aqueous portion is acidified, extracted with ethyl ether, and the ether fraction washed with water, dried and evaporated to yield 103.3 g. of n-decene phosphonous acid. The elemental analysis of this acid gives a phosphorus value of 15.1% by weight, which figure is in good agreement with the calculated value of phosphorus content equal to 15.2%. The results of the infrared analysis check satisfactorily with those of the elemental analysis.

*Example 2.—Preparation of n-decane phosphorite and its esters*

The decane phosphorite intermediate prepared by reacting the mixture of n-decene-1, acetic anhydride and phosphorus trichloride of Example 1 and recovered from the product mixture in substantially the same manner as described in Example 1, when analyzed, shows the presence of but a trace of chlorine, of two atoms of phosphorus and of three atoms of oxygen. Its low bromine number indicates saturation of its hydrocarbon portion. The elemental analyses of diethyl and dibutyl decane phosphonite phosphite esters prepared by reacting the alkane phosphorite intermediate with ethyl and butyl alcohols, respectively, confirms the presence of two atoms of phosphorus.

*Example 3.—Preparation of n-dodecane phosphonous acid by way of alkane phosphorate (with introduction of oxygen)*

A mixture of 168 g. (1 mol) of n-dodecene-1, 306 g. (3 mols) of acetic anhydride, and 544 g. (4 mols) of phosphorus trichloride is introduced into a flask equipped with a reflux condenser, a thermometer immersed in the above reaction mixture, and a sintered glass plate at the bottom of the flask for the admission of oxygen. The flask is immersed into a constant-flow water-bath, and the oxygen is bubbled through it at the rate so adjusted as to maintain the temperature at a figure not exceeding 60° C. After about 20 minutes a colorless precipitate is noted to collect on the walls of the flask. On continuing the admission of oxygen, this precipitate turns yellow and finally redissolves by the time the reaction is completed in about 4 hours. The reaction mixture is then slowly poured into 1 liter of water with stirring and adding ice to maintain the temperature between 70 to 80° C. The water solution is thoroughly extracted with petroleum ether and the petroleum ether fraction treated with an excess of a 25% aqueous solution of NaOH. The product and the aqueous fraction are washed repeatedly with petroleum ether to remove unreacted n-dodecene-1 and subsequently acidified with concentrated hydrochloric acid and extracted with ethyl ether. After a water wash, the ethyl ether extract is dried over calcium sulfate, and the solvents evaporated, leaving 116 g. of a dark-colored viscous oil which is identified as n-dodecene phosphonous acid ($C_{12}H_{25}PO_2$). The bromine number of this acid is 52, and the elemental anaylsis gives it a phosphorus content of 13.1% by weight which checks satisfactorily with the calculated figure of 13.3%.

*Example 4.—Preparation of n-dodecene phosphorate and its ester derivatives*

Another test is made with the aim of securing and identifying the intermediate of Example 3. Same reactants and same amounts thereof are used under identical conditions. However, after dissolution of the precipitate, the reaction product mixture is placed in a 1-liter suction flask and evaporated under reduced pressure to a thick, foaming residue weighing about 450 g. It is diluted with 2 liters of low-boiling petroleum ether and allowed to stand over night. The settled mass is filtered, and the residue washed with petroleum ether before being placed in a vacuum drier where it is evaporated to constant weight. The yield of the dried intermediate amounts to 224 g. The resulting alkane phosphorate is highly hygroscopic, insoluble in petroleum ether, benzene and ethyl ether, but soluble in glacial acetic acid. However, it will not crystallize from the acetic acid solution when diluted with petroleum ether. When placed into acetone, it changes from a solid to an oily viscous fluid. The phosphorus content determined by elemental analysis is equal to 22.7%, which figure checks satisfactorily with the theoretically expected value of 22.7% for phosphorus.

Ester derivatives of the above dodecane phosphorate intermediate are prepared by esterification of this latter with ethyl and butyl alcohols, respectively. In the first case, 20 g. of dodecane phosphorate is dissolved in 50 ml. of absolute ethyl alcohol. After boiling for 4 to 5 minutes and on evaporating the excess of alcohol on a steam bath under reduced pressure, a light colored viscous oil is obtained. When subjected to elemental analysis, this partial ester gives a phosphorus content value of 16.6%, which agrees with the theoretically calculated value of 16.1% for diethyl dodecane phosphonite $C_{16}H_{36}P_2O_5$.

In the esterification of butyl alcohol, 30 g. of the intermediate is placed into 50 ml. of butyl alcohol and stirred to complete solution. The resulting mixture is heated for 10 minutes on a steam bath, cooled and poured into an excess of 10% aqueous sodium hydroxide. The aqueous solution is extracted with petroleum ether, esterified with concentrated hydrochloric acid and extracted again with ethyl ether. After a water wash, the ether extract is dried over calcium sulfate, whereupon the solvents are evaporated, leaving 34.2 g. of a light colored viscous oil. The elemental analysis of this product gives a phosphorus content value of 14.8% by weight, which compares satisfactorily with the calculated value of 14.1.

*Example 5.—Preparation of n-tetradecene phosphonous acid*

A homogeneous liquid mixture of 196 g. of n-tetradecene-1, 306 g. of acetic anhydride and 500 g. of phosphorus trichloride is placed into a flask similar to the one employed in Example 3, and an excess of oxygen is bubbled therethrough for 5 hours. Thereafter the reaction mixture is poured slowly into 2000 liters of water without cooling and then cooled and extracted with petroleum ether. The extract is diluted with ethyl alcohol and treated with an excess of a dilute sodium hydroxide solution. The alcoholic portion is then extracted three times with petroleum ether to remove the unreacted olefin, acidified with hydrochloric acid and the product extracted with ethyl ether. The ether solution is next dried over calcium sulfate ("Drierite") and evaporated, furnishing 151 g. of n-tetradecene phosphonous acid. The phosphorus content of 11.5% by weight determined by elemental analysis checked satisfactorily with the calculated value of 11.9%. The results of the infrared analysis were in agreement with those of the elemental analysis, confirming the fact of formation of n-tetradecene phosphonous acid.

*Example 6.—Preparation of alkene phosphonous acids from a fraction of $C_{12}$–$C_{15}$ polypropylene*

The same equipment as in the preceding example is employed, 170 g. of a tetramer-pentamer fraction of polypropylene boiling within the range from about 160° to about 275° C. being heated in the reaction flask to 80° C. Oxygen is bubbled in slowly while a solution of 150 g. of phosphorus trichloride and 100 g. of acetic anhydride is added dropwise at such a rate as to maintain the reaction temperature at 65 to 70° C. When the addition is completed after about 2 hours, an excess of oxygen is introduced for 2 hours longer, whereupon the entire mass is poured into water. The solution is warmed to 80° C. and then cooled. Upon extraction with petroleum ether, ethyl alcohol is employed to dilute the extract as in Example 5, and this diluted mixture alkalized with an excess of a dilute sodium hydroxide solution. The alcoholic solution is extracted with petroleum ether and acidified with hydrochloric acid. The product is extracted with ethyl ether, and the ether solution is washed with water, dried over calcium sulfate and evaporated, yielding 35 g. of a mixture of alkene phosphonous acids. The phosphorus content value of 10.2% by weight found for these acids by elemental analysis checks satisfactorily with the theoretically computed figure.

The aforedescribed partial esters of the intermediates for the preparation of alkene phosphonous acids, i. e. dialkyl alkane phosphonite phosphites and phosphates, as the case may be, can be reacted with various inorganic bases and will yield mixtures of surface-active salts of alkene phosphonous acids. A particularly valuable type of a surface-active salt of these partial esters is obtained by reacting them with an equivalent amount of an alkali metal base such as sodium hydroxide or potassium hydroxide. When sodium hydroxide is reacted with dialkyl alkane phosphonite phosphates, sodium salts are obtained which possess attractive wetting characteristics and are suitable for the preparation of effective wetting agents.

Another highly valuable type of new compounds which may be prepared from the alkene phosphonous acids produced by the process of the present invention is constituted by the alkylene glycol esters of alkene phosphonous acid. The term "alkylene glycol esters" as employed in this specification includes phosphonous acid esters (phosphonites) of monoalkylene and polyalkylene glycols and corresponds to the general formula:

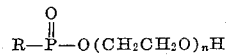

in which R is an alkenyl radical and $n$ is an integer equal to from 1 to 10 or higher, but preferably to from 1 to 4. A large number of these glycol esters have been prepared, as will be seen from Tables I, III and IV. It is believed, however, that the following Examples 7 and 8 will suffice to illustrate the preparation of these new compounds.

*Example 7*

A mixture of 24.8 g. (0.1 mol) of n-dodecene phosphonous acid, prepared by the procedure shown in Example 1, and 5 g. of a contact catalyst, such as silica gel, is warmed to 80° C. and treated dropwise with ethylene oxide in accordance with the process described and claimed in a copending application, Serial No. 183,283, filed September 5, 1950, by A. H. Lewis and R. D. Stayner. After evaporation in vacuo of the resulting reaction mixture to a 34-g. weight, the reaction mixture is cooled, diluted with ethyl ether, filtered, and the solvent is then removed under reduced pressure. The final product is a tan-colored, water-soluble liquid having the formula

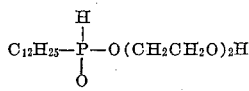

which, correspondingly, is named dodecene diethylene glycol phosphonite. Upon elemental analysis a phosphorus content of 9.2% is found, which agrees with the calculated value of 9.6%.

*Example 8*

A mixture of 55.2 g. (0.2 mol) of n-tetradecene phosphonous acid and 0.2 g. of sodium hydroxide as a catalyst is treated dropwise with ethylene oxide with shaking at a temperature from 100 to 120° C. until the gain in weight after evaporation under reduced pressure is about 55 g. Upon cooling the reaction mixture, the final product is identified as

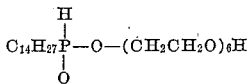

i. e., tetradecene hexaethylene glycol phosphonite. The elemental analysis of this product indicated a phosphorus content of 5.8% which agreed with the calculated value of 6.2.

Many other catalysts capable of increasing the reaction rate for the reactions of various alkylene oxides and alkene phosphonous acids may be employed, the temperature of the reaction varying within the limits set forth in the aforementioned application of A. H. Lewis and R. D. Stayner. Examples of these catalysts are: Nickel sulfate, phosphoric acid, boron trifluoride, alkyl sulfate, etc.

The alkene phosphonous acids produced by the method of my invention can be used for the preparation of esters of various alcohols, e. g., ethyl alcohol, isopropyl alcohol, benzyl alcohol, etc. Likewise, various organic and inorganic salts of alkene phosphonous acids may be prepared by reacting these acids with appropriate bases. All of these esters and salts possess surface-activity, which fact renders them useful for a variety of applications. Particularly interesting in this respect are the alkali metal salts of alkene phosphonous acid. I have prepared monosodium salts of several alkene phosphonous acids by the following procedure: A reaction product mixture obtained by reacting phosphorus trichloride, acetic anhydride and an olefin, e. g., n-decene-1, in the amounts and under the conditions set forth in Example 1, and weighing 570 g., is slowly poured with stirring into 1 liter of water, ice being added at frequent intervals to maintain the temperature between 70 and 80° C. After cooling, the mixture is extracted with petroleum ether, and the petroleum ether fraction treated with a 25% solution of sodium hydroxide to yield a monosodium salt of an alkene phosphonous acid. This salt dissolves readily in water, is partly soluble in strong alkaline solution, but is insoluble in petroleum ether. As will be shown later on in this specification, this type of salt is characterized by good wetting, detergent and foam-forming properties, which vary in accordance with the particular alkene phosphonous acid employed.

As pointed out at the outset of this description, alkene phosphonous acids and their derivatives containing a combination of hydrophobic organic and hydrophilic inorganic groups are characterized by surface-activity manifested by detergency, emulsifying power, wetting power, foaming tendency, and the like.

Since alkene phosphonous acids and their derivatives such as salts, esters, alkylene glycol and polyalkylene glycol esters, as well as the previously described derivatives of the intermediate phosphorates and phosphorites, are all characterized by various degrees of surface-activity, they are desirable as constituents for a number of useful compositions, for instance, detergents, emulsifiers, suds boosters, wetting agents, and the like. In view of the surface-active tendencies of the derivatives of alkene phosphonous acids, I carried out a number of tests to compare their surface-active properties, and particularly the surface-active properties of the derivatives of n-dodecene, n-tetradecene, n-hexadecene, and n-octadecene phosphonous acids with those of two well-known commercial surface-active agents: the anionic sodium alkyl benzene sulfonate in which the alkyl group is a polypropylene radical containing from 12 to 15 carbon atoms, and the non-ionic octyl phenyl nonyl glycol ether. The results of these tests are tabulated in the following Tables I, II, III and IV.

Wetting activity values shown in Tables I and II have been determined by the so-called "canvas-square method" which measures the number of seconds required for one square inch sample of standard #6 canvas to sink to the bottom when placed on the surface of 200 ml. of a solution to be tested in a 250 ml. beaker.

*Table I*

WETTING ACTIVITY OF DERIVATIVES OF ALKENE PHOSPHONOUS ACIDS

| Compound [1] | Number of C atoms in the Alkene Portion of the Acid | | | |
|---|---|---|---|---|
| | $C_{12}$ | $C_{14}$ | $C_{16}$ | $C_{18}$ |
| Monosodium salt R–P(=O)(H)(ONa) | [2] 26.5 | | | |
| Diethyleneglycol ester | 9.7 | 16.0 | 25.1 | |
| Tetraethyleneglycol ester | | 26.1 | 40.8 | 77.4 |
| Hexaethyleneglycol ester | | 32.6 | 69.2 | |
| Octaethyleneglycol ester | | 62.2 | 90.3 | |
| Sodium "Polypropylene ($C_{12}$-$C_{15}$) benzene" Sulfonate (100%) | 6.1 | | | |
| Octyl Phenyl Nonyl Glycol Ether | 7.1 | | | |

[1] Concentration 0.5%.
[2] Wetting times in seconds.

*Table II*

WETTING ACTIVITY OF DERIVATIVES OF ALKANE PHOSPHORITES

| Compound (Concentration 0.5%) | Seconds |
|---|---|
| Diethyl dodecane phosphonite phosphite | 46.1 |
| Sodium salt of dibutyl dodecane phosphonite phosphite | 37.8 |
| Sodium "Polypropylene ($C_{12}$-$C_{15}$) Benzene" sulfonate (100%) | 6.1 |
| Octyl phenyl nonyl glycol ether | 7.1 |

It is noted from the results of the wetting tests that diethyleneglycol ester of n-dodecene phosphonous acids is about as good a wetting agent (when used in a concentration of 0.5%) as the 100% octylphenylnonylglycol ether and the sodium "polypropylene benzene" sulfonate containing from 12 to 15 carbon atoms in the polypropylene chain when used in a concentration of 0.5%.

Detergency determinations were made on soiled cotton cloth in accordance with the standard launderometer procedure (see Year Book of American Association of Textile Chemists and Colorists, 1944, p. 149). The resulting detergency data are given in terms of a "Soap Index" which term is used to designate a ratio of the percentage of soil removal by the compound being tested to the percentage of soil removal secured with pure fatty acid soap ("White Ivory") at the same concentration and under otherwise identical test conditions.

*Table III*

DETERGENCY OF DERIVATIVES OF ALKENE PHOSPHONOUS ACIDS

| Compound (Concentration 0.4%) | Number of Carbon Atoms in the Alkene Portion of the Corresponding Acid | | | |
|---|---|---|---|---|
| | $C_{12}$ | $C_{14}$ | $C_{16}$ | $C_{18}$ |
| | Soap Index | | | |
| Monosodium salt | 0.33 | 0.55 | 0.61 | 0.55 |
| Diethyleneglycol ester | 0.11 | 0.63 | 0.57 | ------ |
| Tetraethyleneglycol ester | ------ | 0.40 | 0.59 | 0.57 |
| Hexaethyleneglycol ester | ------ | 0.56 | 0.49 | ------ |
| Octaethyleneglycol ester | ------ | 0.52 | 0.41 | ------ |
| Sodium "polypropylene ($C_{12}$-$C_{15}$) benzene" sulfonate (100%) | 0.60 | ------ | ------ | ------ |
| Sodium lauryl sulfate (40/60) | 0.60 | ------ | ------ | ------ |

It is noted from Table III that the monosodium salts of alkene phosphonous acids containing from 14 to 18 carbon atoms in the alkenyl radical and the alkylene glycol and polyalkylene glycol esters of the same acids, when employed as detergents for cotton cloth, compare favorably with the conventional commercial detergents such as sodium "polypropylene benzene" sulfonate and sodium lauryl sulfate.

Foaming characteristics of the various derivatives of alkene phosphonous acids were determined for 0.4% solutions thereof in water by the Ross-Miles method described in "Oil and Soap" for May 1941, pages 99–102. The results of these determinations are tabulated in Table IV. In this table the values are given in millimeters and measure the height of foam which forms when 200 cc. of solution are allowed to fall in a fine stream through a distance of 90 cm.

*Table IV*

FOAMING CHARACTERISTICS OF DERIVATIVES OF ALKENE PHOSPHONOUS ACIDS

| Compound (Concentration 0.4%) | Number of Carbons in the Alkene Portion of the Corresponding Acid | | | |
|---|---|---|---|---|
| | $C_{12}$ | $C_{14}$ | $C_{16}$ | $C_{18}$ |
| Monosodium salt | ------ | 205 | 113 | 132 |
| Diethyleneglycol diester | 158 | 151 | 129 | ------ |
| Tetraethyleneglycol diester | ------ | 190 | 125 | 112 |
| Hexaethyleneglycol diester | ------ | 177 | 133 | ------ |
| Octaethyleneglycol diester | ------ | 164 | 137 | ------ |

Since it is generally held that only the values of 50 mm. or less are indicative of poor foaming, the results unmistakably show the advantages which can be secured with derivatives of alkene phosphonous acids in compositions where good foaming is desired. Derivatives of tetradecene phosphonous acid are particularly effective as foam agents.

Tests were made to prepare stable 50-50 emulsions of xylene and water by using 2.5% of diethyleneglycol and tetraethyleneglycol esters of hexadecene and octadecene phosphonous acids. The results were highly satisfactory and in all four cases good xylene-water emulsions were formed which remained stable after twenty-four hours.

In addition to the applicability of derivatives of alkene phosphonous acids in different compositions as surface-active agents, such as detergents, wetting agents, suds boosters and emulsifiers, these acids and their corresponding phosphorite and phosphorate intermediates described hereinabove, can be converted to a number of derivatives suitable for the manufacture of oil additives, insecticides, germicides, plasticizers and various other useful compositions.

In concluding the above description, it is to be understood that the aforegiven specification and examples are merely illustrative of the invention, and that any modification of or variation therefrom in conformity with the spirit of the invention is to be included within the scope of the following claims.

I claim:

1. Alkylene glycol esters of alkene phosphonous acids having the general formula

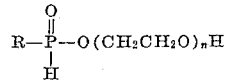

wherein R is an alkenyl radical having the double bond joining the carbons in the position $\alpha,\beta$ to the phosphorus atom and $n$ is an integer from 1 to 10.

2. Alkylene glycol esters of alkene phosphonous acids as defined in claim 1 wherein said alkenyl radical contains from 12 to 16 carbon atoms.

References Cited in the file of this patent

UNITED STATES PATENTS

| Number | Name | Date |
|---|---|---|
| 2,389,576 | Kosolapoff | Nov. 20, 1945 |
| 2,516,168 | Woodstock | July 25, 1950 |
| 2,587,340 | Lewis et al. | Feb. 26, 1952 |